(12) United States Patent
Silny et al.

(10) Patent No.: US 8,693,947 B2
(45) Date of Patent: Apr. 8, 2014

(54) EXTENSIBLE HIGH BANDWIDTH GLOBAL SPACE COMMUNICATION NETWORK

(76) Inventors: John F. Silny, Los Angeles, CA (US); Gary D. Coleman, Redondo Beach, CA (US); C. Thomas Hastings, Jr., Manhattan Beach, CA (US); William J. Miniscalco, Sudbury, MA (US); James McSpadden, Allen, TX (US)

(*) Notice: Subject to any disclaimer, the term of this patent is extended or adjusted under 35 U.S.C. 154(b) by 438 days.

(21) Appl. No.: 13/117,700

(22) Filed: May 27, 2011

(65) Prior Publication Data

US 2012/0302160 A1 Nov. 29, 2012

(51) Int. Cl.
*H04B 7/185* (2006.01)

(52) U.S. Cl.
USPC .......................................... 455/12.1

(58) Field of Classification Search
USPC ...................................... 455/12.1
See application file for complete search history.

(56) References Cited

U.S. PATENT DOCUMENTS

| | | | | |
|---|---|---|---|---|
| 4,004,098 A | * | 1/1977 | Shimasaki | 370/325 |
| 6,301,231 B1 | * | 10/2001 | Hassan et al. | 370/316 |
| 6,741,841 B1 | * | 5/2004 | Mitchell | 455/188.1 |
| 7,505,736 B2 | * | 3/2009 | Min | 455/12.1 |
| 7,796,986 B2 | * | 9/2010 | Karabinis | 455/430 |
| 2002/0003490 A1 | * | 1/2002 | Chang et al. | 342/357.01 |
| 2003/0095064 A1 | * | 5/2003 | Branscombe et al. | 342/354 |
| 2003/0233658 A1 | * | 12/2003 | Keen et al. | 725/76 |
| 2004/0157563 A1 | * | 8/2004 | McLain et al. | 455/67.11 |
| 2004/0219879 A1 | * | 11/2004 | Stephenson | 455/12.1 |
| 2005/0219119 A1 | * | 10/2005 | Hsu | 342/357.03 |
| 2008/0247351 A1 | * | 10/2008 | Dankberg et al. | 370/316 |

* cited by examiner

*Primary Examiner* — Bobbak Safaipour
(74) *Attorney, Agent, or Firm* — Pierce Atwood LLP; Joseph M. Maraia

(57) ABSTRACT

Various embodiments provide a satellite communication system including a first transceiver and a second transceiver geographically fixed on the earth, and a first satellite configured to communicate with the first transceiver through a first link. The system further includes a second satellite configured to communicate with the second transceiver through a second link and communicate with the first satellite through a laser communication crosslink. The first satellite and the second satellite are at a low earth orbit or medium earth orbit below the geostationary earth orbit of approximately 36000 km.

25 Claims, 7 Drawing Sheets

EXTENSIBLE HIGH BANDWIDTH GLOBAL SPACE COMMUNICATION NETWORK

BACKGROUND

This disclosure pertains generally to networked communication satellite systems and in particular to an extensible high bandwidth global space communication satellite system.

Satellite constellations are used as a network of a plurality communication satellites to provide coordinated ground coverage. The plurality of networked satellites operate together under shared control and are synchronized so that their communication coverage may overlap to complement each other while minimizing interference between the satellites' coverage.

Low earth orbiting satellites (LEOs) are often deployed in satellite constellations. Because the coverage area provided by a single LEO satellite only covers a small area that moves as the satellite travels at high angular velocity needed to maintain its orbit, a plurality of LEO satellites are often needed to maintain continuous coverage over a larger area. Examples of satellite constellations include the Global Positioning System (GPS), Galileo and GLONASS constellations for navigation and geodesy, the Iridium® and Globalstar satellite telephony services, the Disaster Monitoring Constellation and RapidEye for remote sensing, the Orbcomm messaging service, Russian elliptic orbit Molniya and Tundra constellations, the large-scale Teledesic and Skybridge broadband constellation proposals of the 1990s, and the proposed LEO global backhaul constellation named COMMStellation™.

One benefit of using LEO satellites is the ability to provide low latency broadband telecommunications compared to geostationary earth orbit (GEO) satellites. Indeed, the latency of Earth-to-LEO satellite communication or LEO satellite-to-earth communication is about 1 ms to 5 ms, whereas the one-way latency of Earth-to-GEO satellite communication is about 120 ms. A LEO satellite constellation can also provide more system capacity by frequency reuse across its coverage, with spot beam frequency use being similar to the frequency reuse of cellular radio towers.

Medium Earth orbit (MEO) satellite constellations may also provide a solution for overcoming the latency challenge in GEO constellations. MEO is the region of space around the Earth above low Earth orbit (altitude of 2,000 km) and below geostationary orbit (altitude of 35,786 km). The most common use for satellites in this region is for navigation, such as the GPS Glonass, and Galileo constellations.

Presently, there are various conventional commercial type satellite communication systems. One satellite communication system intended for the internet is Teledesic which has never been fully implemented. Teledesic successfully launched only one satellite. Another satellite communication system intended for voice and data communication is Iridium® which has a total of 66 satellites. Iridium® is a LEO satellite constellation. Iridium® has low latency communication and supports inter-satellite links only between satellites orbiting in the same direction using RF based cross-links. The cross-links have a limited bandwidth capacity which can be sufficient for voice, but insufficient for real-time video feed.

GEO satellite constellations such as the European Data Relay Satellite (EDRS) system are based on geostationary earth orbit satellites which are at a higher altitude from the earth's surface. EDRS satellites relay information between satellites and ground stations. Certain GEO constellations utilize a laser cross-link to provide communication between satellites. However, due to the position of the satellites at relatively higher altitude (about 36000 km above sea level) the communication latency from a ground base station to the satellite is about 120 ms for a one-way trip. Furthermore, deploying GEO satellites is far more expensive than deploying LEO or MEO satellites.

Prior satellite communication systems have not been able to support a relatively broad communication bandwidth while providing a real-time, extendible or reconfigurable communication network.

With the increasing need for satellite communications, there is a persistent need in the art for a system and method for providing an extensible high bandwidth communication satellite network.

SUMMARY

One or more embodiments of the present disclosure provide a satellite communication system including a first transceiver and a second transceiver geographically fixed on the earth, and a first satellite configured to communicate with the first transceiver through a first link. The system further includes a second satellite configured to communicate with the second transceiver through a second link and communicate with the first satellite through a laser communication crosslink. The first satellite and the second satellite are at a low earth orbit or medium earth orbit below the geostationary earth orbit of approximately 36000 km.

These and other features and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of this disclosure, the structural components illustrated herein are drawn to scale. It is to be expressly understood, however, that the drawings are for the purpose of illustration and description only and are not intended as a definition of the limits of the inventive concept. As used in the specification and in the claims, the singular form of "a", "an", and "the" include plural referents unless the context clearly dictates otherwise.

DETAILED DESCRIPTION

Figure 1:
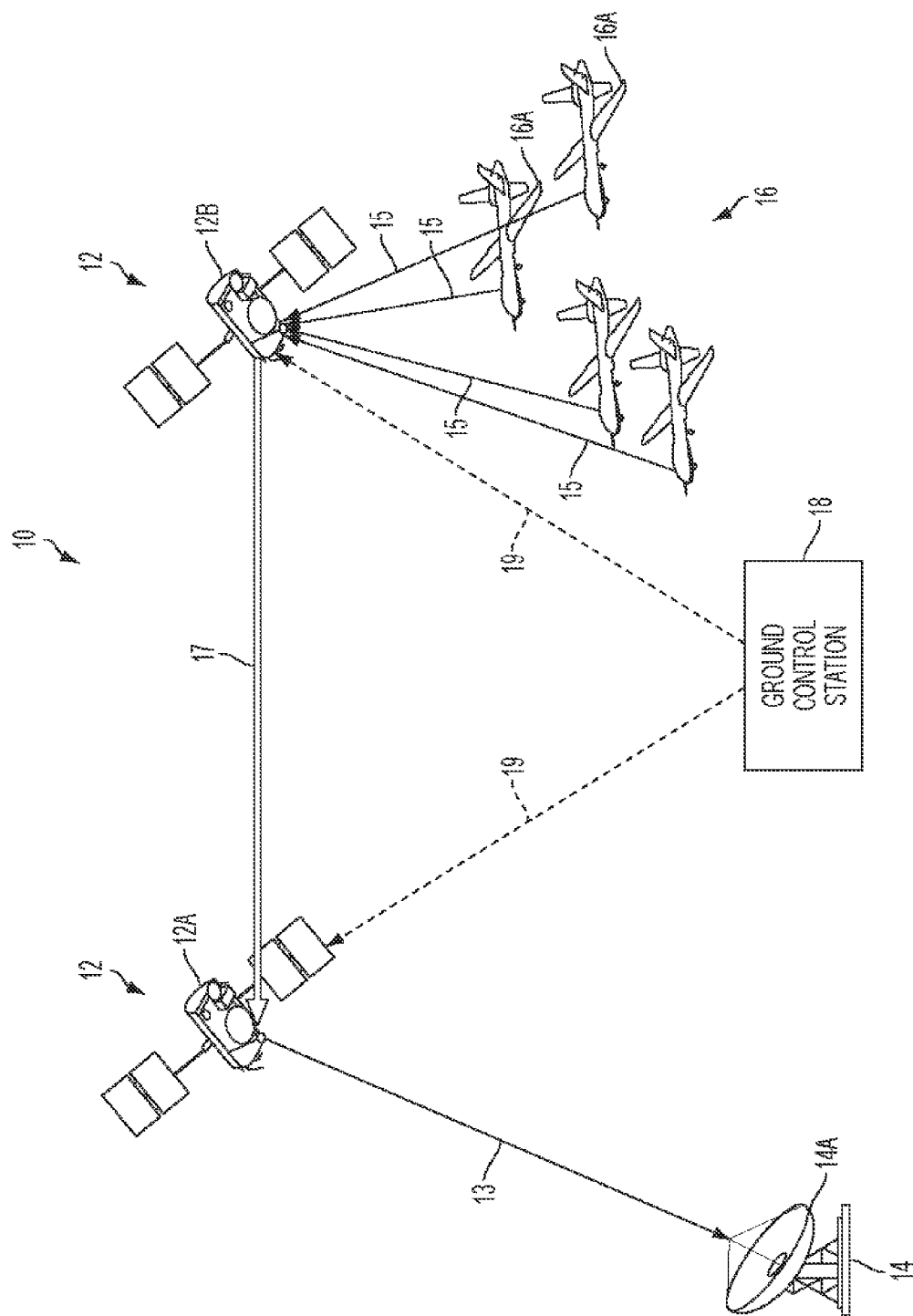
FIG. 1 is a schematic block diagram showing a satellite communication system, according to one embodiment.

FIG. 1 is a schematic block diagram showing a satellite communication system, according to one embodiment. Satellite communication system 10 comprises plurality of satellites 12. Although two satellites 12A and 12B are shown in FIG. 1, any number of satellites 12 can be employed in satellite communication system 10. Satellite communication system 10 is configured to provide real time, global communication access, from multiple areas in a large region of the globe or around the globe as a whole. Satellite communication system 10 further includes one or more ground based transceiver or ground base station 14. For example, in one embodiment, one or more ground based transceivers 14 can be configured to send (uplink) or receive data from one or more of the plurality of satellites 12. One or more ground based transceivers 14 can be positioned in multiple area of a large region of the globe so as to be able to communicate with satellite 12B for increased communication coverage. One or more ground based transceivers 14 can be in communication with one, two or more satellites 12. For example, as shown in n FIG. 1, ground based transceiver or ground base station 14 is shown receiving data from satellite 12A via downlink 13. Satellite communication system 10 further comprises one or more transceivers 16. In one embodiment, transceivers 16 are provided on airborne assets 16A such as, but not limited to, unmanned airborne vehicles (UAVs) or other types of aircraft. However, one or more transceivers 16 can also be positioned on any moveable vehicle or provided stationary on the ground surface. As shown in FIG. 1, one or more plurality of airborne assets (e.g., UAVs) 16 are shown transmitting data to satellite 12B via links 15.

In general, UAVs 16 are provided with antennas configured to acquire and track a moving LEO satellite 12 (e.g., satellite 12B). Once the LEO satellite 12 is out of view, the antennas of UAV 16 acquire and track the next viewable LEO satellite 12. In the case of a GEO satellite, the UAVs 16 are also provided with antennas for acquiring and tracking the GEO satellite. However, because the GEO satellite is stationary, the antenna of the transceiver on UAV 16 only acquires and tracks one satellite (the GEO satellite) which is stationary. However, due to considerably higher latency for the GEO systems, the GEO system may not be the appropriate configuration for real-time data transmission.

Satellite system 10 is also configured so that plurality of satellites 12 communicate with each other through crosslinks. For example, as shown in FIG. 1, satellite 12A is depicted in communication with satellite 12B through crosslink 17. One possible communication scenario would be that, for example, airborne assets 16 send data to satellite 12B via uplink 15. Satellite 12B in turn relays the received data to satellite 12A through crosslink 17. Satellite 12A then transmits the data received from satellite 12B to ground based station 14 through downlink 13. Although FIG. 1 depicts the use of two satellites, three or more satellites 12 can be used, in which case a plurality of cross-links 17 can be used to transmit information or data from the satellite that receives the uplink to the satellite that sends downlinks the data to the ground base station.

In one embodiment, the communication from transceivers 16 on airborne assets 16A to satellite 12B or from satellite 12A to ground based station 14 can be performed in real time, i.e., with low latency less than 100 ms. In one embodiment, satellite communication system 10 supports a relatively broad communication bandwidth, greater than about 1 gigabit per second (1 Gbps) in uplink 15 or downlink 13 to provide relatively large sets or streams of data to be uplinked from, for example, transceiver 16A on airborne asset 16 to satellite 12B and downlinked from, for example, satellite 12A to ground base station 14.

In one embodiment, the satellite communication system 10 is extendible or reconfigurable in that a constellation of satellites in orbit can be upgraded without any lost connectivity, i.e., provides a seamless extensibility or seamless upgrade. In one embodiment, the constellation can be extended or reconfigured or upgraded by adding one or more satellites 12 either for redundancy by filling in nodes of the network or can be software upgraded on orbit by uploading desired software or hardware. In one embodiment, for example, the added satellites can be provided with more capable equipment for increasing data rates to improve the overall bandwidth of the network.

In one embodiment, the communication crosslink 17 between satellite 12A and 12B is a laser communication link. In one embodiment, two different wavelengths can be used for sending and for receiving so as prevent any ambiguity and/or to prevent cross-talk. In one embodiment, a single wavelength can be used but with different polarizations for sending and receiving. In one embodiment, the two wavelengths are proximate to each other. However, in another embodiment, the two wavelengths may be widely separated when desired. In one embodiment, one laser wavelength is around 1.550 μm and the other laser wavelength is around 1.564 μm. However, as it can be appreciated, any practical and convenient wavelengths can be used. In one embodiment, the communication data rate or bandwidth is about 10 gigabits per second for the crosslink 17. However, the communication data rate or bandwidth can also be increased to 40 gigabits per second or more. Alternatively, the communication data rate can also be lower than 10 gigabits per second if desired. In one embodiment, the laser communications crosslink 17 can employ a plurality of wavelengths for sending and a plurality of wavelengths for receiving. For example, this can be done to increase the data rate by means of wavelength division multiplexing. Uplink 15 from transceiver 16 on airborne asset 16A to satellite 12A, and downlink 13 from satellite 12A to ground base station 14 are radio frequency (RF) based communication channels. In one embodiment, each satellite 12 receives over 1 gigabits per second at a frequency of about 29 GHz for one uplink 15. Therefore, for four uplinks 15 (e.g., 4 UAVs uplinking data to satellite 12B), each link would have a data rate or bandwidth of about 274 Mbps. In another embodiment, the data rate or bandwidth of each satellite can be extended above (4×274 Mbps) to, for example, 16×274 Mbps by providing satellites with more power.

Ground base station 14 includes antenna 14A. Antenna 14A is relatively large (e.g., about 12 m in diameter). Antenna 14A can be arranged or oriented to allow communication with multiple orbit planes of satellites simultaneously. In one embodiment, downlink 13 to the ground base station 14 can have a data rate or bandwidth of about one gigabit per second at an RF frequency of about 20 GHz. However, the data rate or bandwidth can be doubled (2×1 Gbps), for example, by using dual polarization, e.g., left hand circular polarization (LHCP) and right hand circular polarization (RHCP).

Although downlink 13 and uplink 15 are described in the above paragraph as being RF based links, downlink 13 and uplink 15 are not limited to RF but can encompass other wavelengths of the electromagnetic spectrum. For example, alternatively or in addition to the RF uplink and RF downlink, laser communication uplinks and downlinks can also be provided, for example, in the similar manner as for crosslink 17.

In one embodiment, satellite system 10 further includes ground control command station 18. Ground control station 18 sends data up or uplinks data via uplink 19 to which ever one of satellites 12 (e.g., satellite 12A or satellite 12B) ground station 18 can communicate at the time. The data is then distributed over the network of satellites 12 by using crosslink 17 between satellites 12.

In one embodiment, ground control station 18 would determine what is the routing path for transmitting data from a satellite receiving data from a UAV (e.g., satellite 12B) to the satellite (e.g., satellite 12A) downlinking the data to the ground base station based on the current data communication loads through the network. Ground control station 18 can specify within the uplinked data a path to route through between satellites 12. In another embodiment, ground control station 18 may not be needed. In which case, satellite system 10 may be provided the control function for example by embedding the control function in satellites 12. In this case, system 10 may monitor itself by, for example, each satellite 12 communicating its status to neighboring satellites 12, and re-route or select an appropriate communication path in real time.

Figure 2:
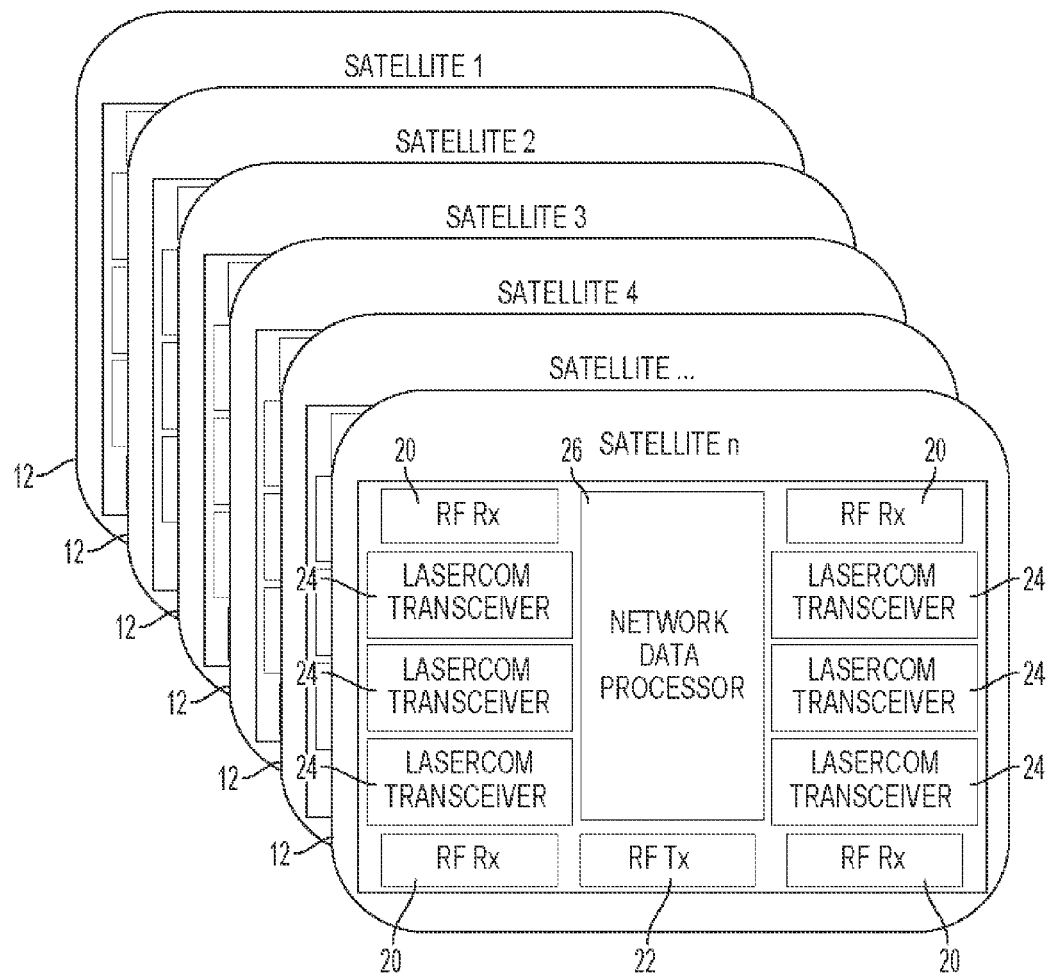
FIG. 2 is a block diagram of components of a satellite of satellite system shown in FIG. 1, according to one embodiment.

FIG. 2 is a block diagram of a satellite of satellite system 10, according to one embodiment. Each satellite 12 (e.g., satellite 12A or satellite 12B) has plurality of RF receivers (RF Rx) 20 and one RF transmitter (RF Tx) 22. FIG. 2 shows that each satellite 12 has four RF receivers. However, one or more RF receivers can be provided in satellite 12. Satellite 12 further comprises plurality of laser communication (lasercom) transceiver 24. In this embodiment, each satellite 12 has six laser communication transceivers 24. However, each satellite 12 can be provided with two or more transceivers 24 (e.g., for example four laser communication transceivers). In one embodiment, the plurality of RF receivers 20 in satellite 12B are configured to receive data from the plurality of transceivers 16 on airborne assets (e.g., UAVs) 16A. One of the laser communication transceivers 24 of satellite 12B is configured to transmit the received data to one of the laser communication transceivers 24 of satellite 12A. RF transmitter 22 of the satellite 12A is configured to transmit the data to ground base station 14.

Each satellite 12 further includes processor 26 configured to control RF receivers 20, RF transmitter 22, and laser communication transceivers 24 and to control routing of data received by RF receivers 20 to RF transmitter 22 for transmitting to desired destinations through the network. Network data processor 26 can also be configured to operate at higher network protocol layers, performing such functions as Layer 2 switching, Layer 3 Internet Protocol routing, and quality-of-service management.

Figure 3:
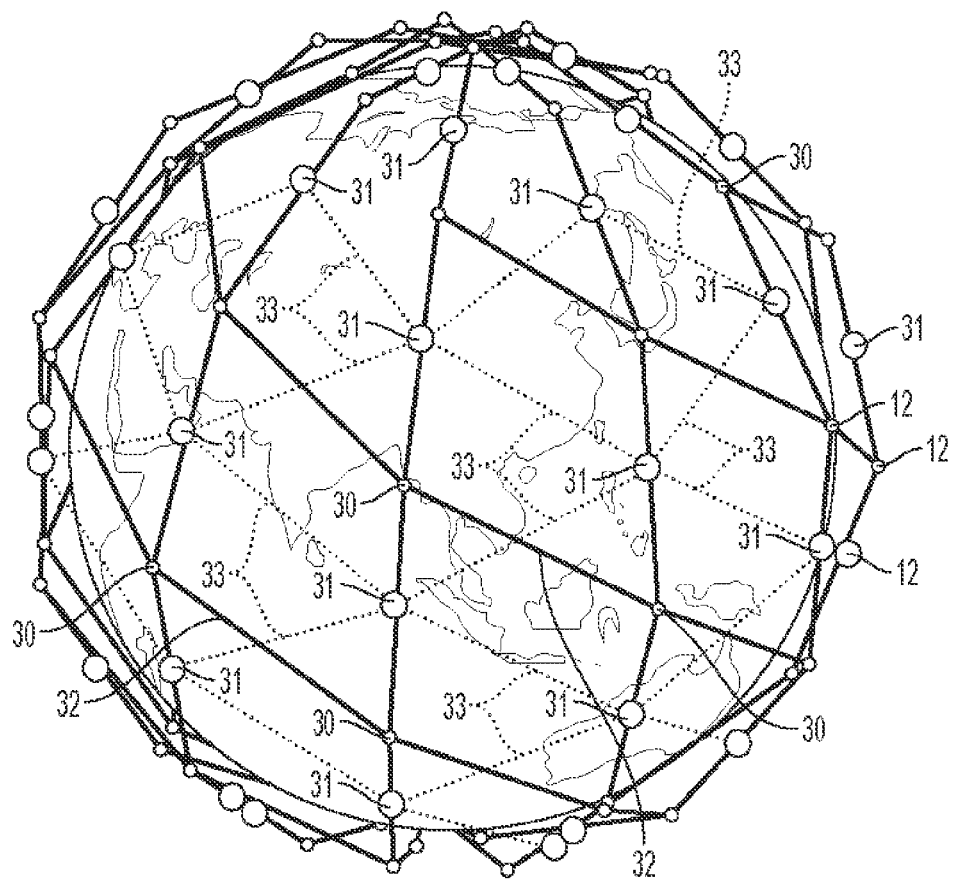
FIG. 3 shows a constellation of plurality satellites over the terrestrial globe, according to one embodiment.

FIG. 3 shows a constellation of satellites 12 over the terrestrial globe, according to one embodiment. In one embodiment, satellites 12 form a constellation (Genesis constellation) that includes constellation of satellites 30 corresponding to an Iridium®-like constellation and constellation of satellites 31 that are added to the Iridium®-like constellation of satellites 30. Satellites 30 which are represented by small dots are connected via cross-links 32 represented by solid lines. Satellites 31 which are represented by larger dots are positioned on the same network of satellites as satellites 30 on the Iridium®-like constellation. Satellites 31 are connected via cross-links 33 represented by dashed lines. In addition, satellites 31 are also connected through cross-links 32. Hence, satellites 12 of the Genesis constellation form a more connected network than the Iridium®-like constellation of satellites 30. In addition, satellites 31 may be added to the Iridium®-like constellation at a future point in time to incorporate evolution upgrades with seamless integration.

FIG. 3 shows six lines corresponding to the various communication paths or cross-links are originating from each satellite 12. These cross-links include both cross-links 32 (solid lines) and cross-links 33 (dashed lines). Each crosslink 32 or 33 is associated with one laser communication transceiver (e.g., laser communication transceiver 24 shown in FIG. 2). Therefore, in one embodiment, there is provided six laser communication transceivers on each satellite 12 of the Genesis constellation. On the other hand, Iridium®-like constellation of satellites 30 only use four crosslink transceivers for communication with neighboring satellites. Indeed, as shown in FIG. 3, there are two neighboring satellites 30 to each satellite 30 in the Iridium®-like constellation that satellite 30 does not have connections to. Therefore, the Genesis constellation of satellites 12 which includes satellites 30 and satellites 31 is more interconnected than the Iridium®-like constellation of satellites 30.

Figure 4:
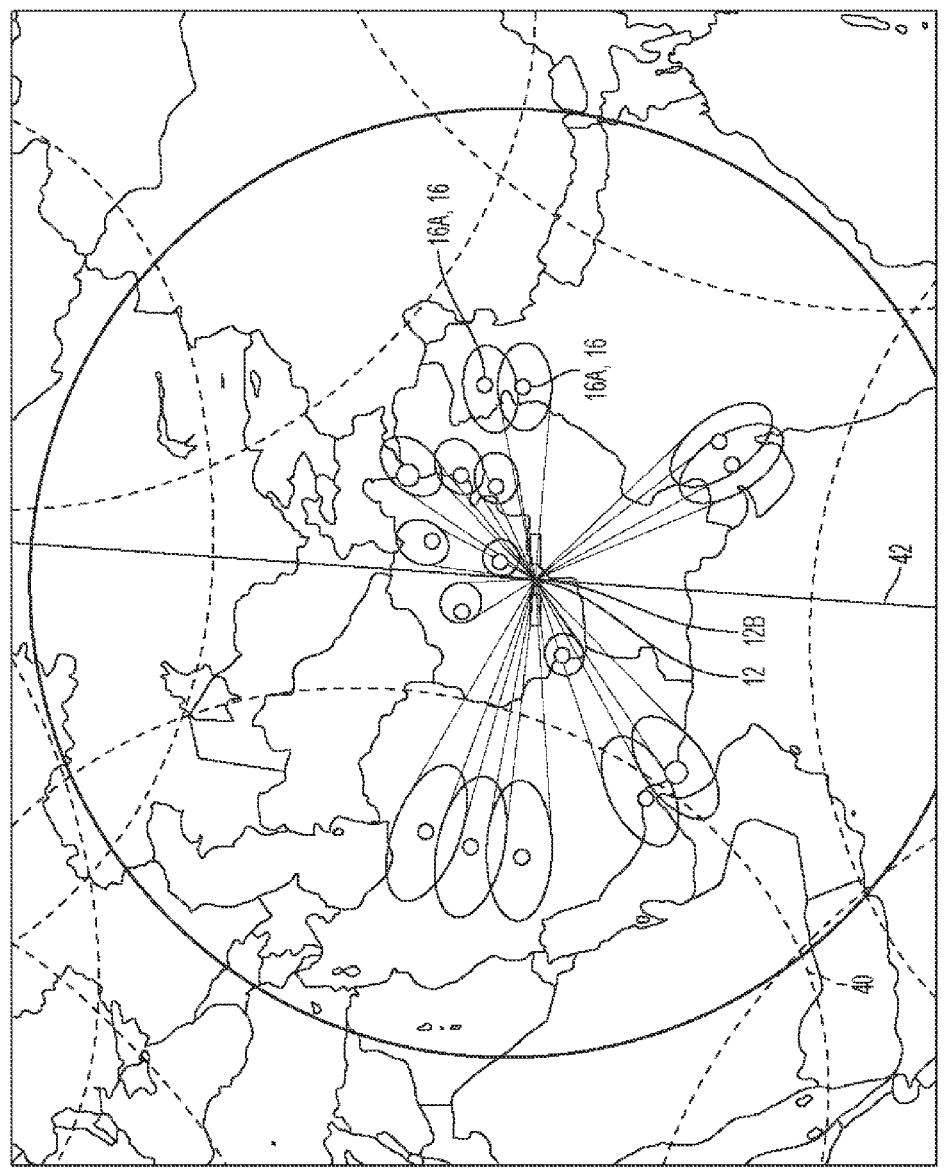
FIG. 4 is a diagram showing communication channels between a plurality of transceivers on unmanned aerial vehicles and a satellite, according to one embodiment.

FIG. 4 is a diagram showing communication channels between plurality of transceivers 16 on UAVs 16A and satellite 12B, according to one embodiment. In FIG. 4, UAVs 16 are shown over South Asia collecting image surveillance data. The coverage of satellite 12B is represented by solid circle 40. The center of circle 40 represents the position of satellite 12B which orbits around the globe around orbit 42. The coverage of other satellites are also depicted by dotted circles. These dotted circles overlap with solid circle 40 to define overlapping coverage with coverage of satellite 12B. Within coverage 40 of satellite 12B (i.e., within circle 40) are shown a plurality of UAVs 16 represented as dots communicating with satellite 12B. The solid ovals represent the RF uplink beam width from UAVs 16 on satellite 12B. A ground base station (not shown in FIG. 4) can be located outside coverage 40 of satellite 12B. Therefore, in this case, satellite 12B sends the data uplinked to satellite 12B through a path between successive satellites 12 (i.e., two or more satellites 12) to a destination satellite (e.g., satellite 12A) having a coverage or footprint that contains the ground base station (e.g., ground base station 14) intended to receive the data. Destination satellite 12A has a coverage that contains the ground base station 14 and would then downlink the data to the ground base station 14, as shown in FIG. 1.

In one embodiment, if only four RF receivers (e.g., RF Rx 20 in FIG. 2) are provided on satellite 12, then only 4 UAVs can be serviced or supported. Hence, additional RF receivers may be needed in order to be able to support up to 16 UAVs. In one embodiment, if there are four transceivers on each satellite 12, UAV 16 that is under coverage of satellite 12B is instructed by command control station 18 (shown in FIG. 1) to transmit to satellite 12B that passes over the UAV 16 which of two channels (frequencies) and which of two polarizations (RHCP or LHCP) to use during a period of contact (e.g., about 9 minutes) with satellite 12B. To accomplish this, a receiving control channel is provided on each UAV so as to enable each UAV 16 to receive the instruction from command control station 18.

Figure 5:
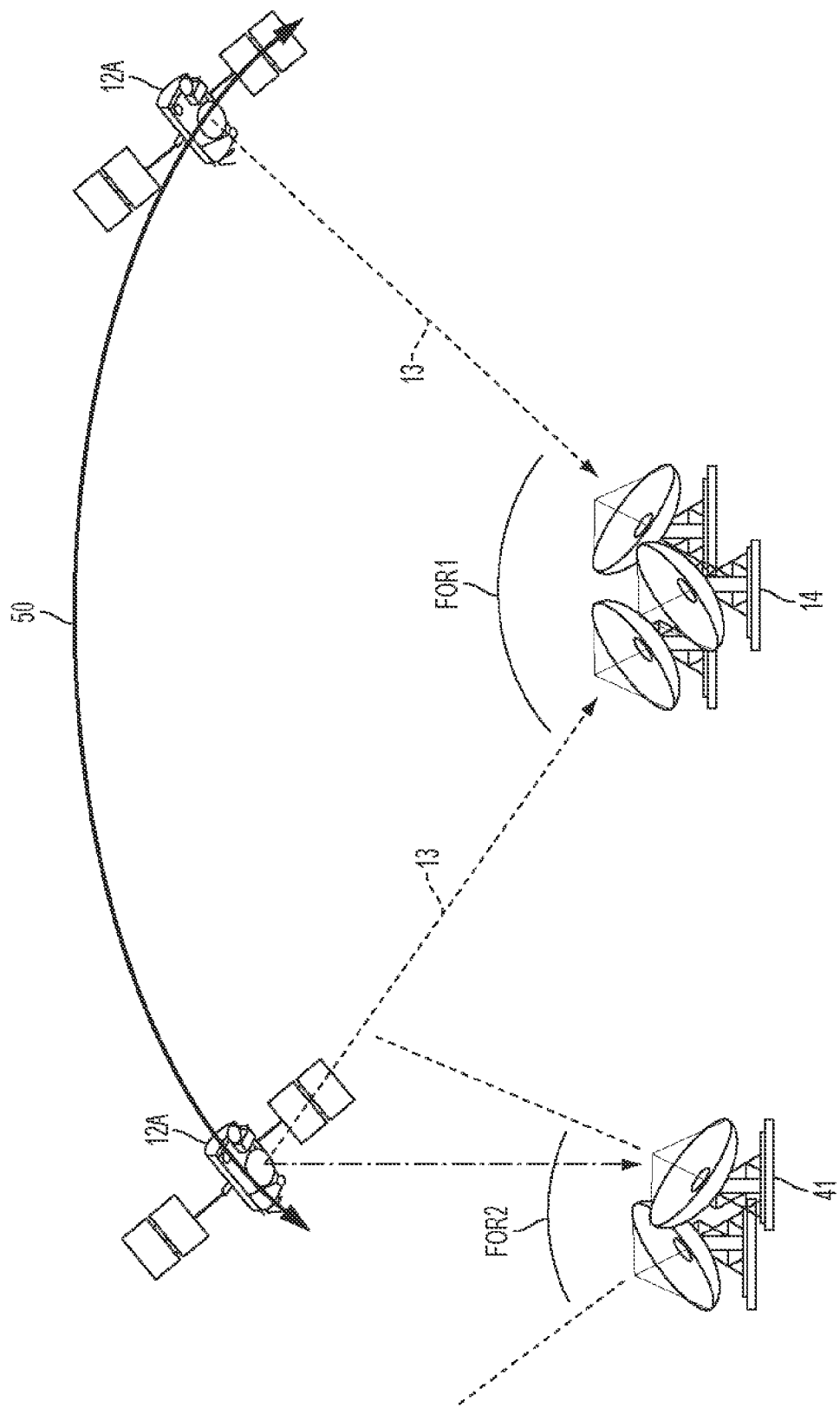
FIG. 5 is a schematic diagram showing a path of a satellite in relation to a plurality of ground base stations, according to one embodiment.

FIG. 5 is a schematic diagram showing a path of satellite 12A in relation to a plurality of ground base stations 14 and 41, according to one embodiment. Although two ground base stations 14 and 41 are shown in communication with satellite 12A along orbit path or orbit plane 50 of satellite 12A, more than two ground stations can be provided to communicate with satellite 12A along orbit plane 50 of satellite 12A. Therefore, orbit plane 50 of satellite 12A would be sharing a plurality of ground base stations (e.g., ground base stations 14 and 41). Each of the ground base stations 14 and 41 may have one, two or more antennas. Satellite 12A can be configured such that its orbit plane 50 would pass over at least two ground stations (e.g., ground stations 14 and 41). With an appropriate arrangement or orientation of the ground antennas of ground station 14, the ground station 14 can have a field of regard (FOR1) such that satellite 12A can have a period of time which depends on the antennas position and arrangement and the orbit speed of the satellite during which to downlink data to the ground station 14 via downlink 13 during transit of satellite 12A. For example, in one embodiment, the period of time can be approximately 20 minutes for satellites at 780 km with an earth view time of about 11 minutes for direct flyovers when starting and ending 8 degrees from the horizon. In other words, ground base station 14 comprises a plurality of antennas configured and arranged so that a field of regard (FOR1) of the antennas provides a period of time sufficient for satellite 12A to downlink data to the ground base station 14 during orbit transit of satellite 12A within the field of regard of satellite 12A. When satellite 12A is out of the field of regard (FOR1) of ground station 14, satellite 12A may "enter" field of regard (FOR2) of ground station 41. In this case satellite 12A may downlink the data to ground station 41 if desired. In one embodiment, there may be 5 other orbit planes 50. Each satellite along each of these orbit paths 50 is able to downlink to a ground station (e.g., ground station 14).

Figure 6A:
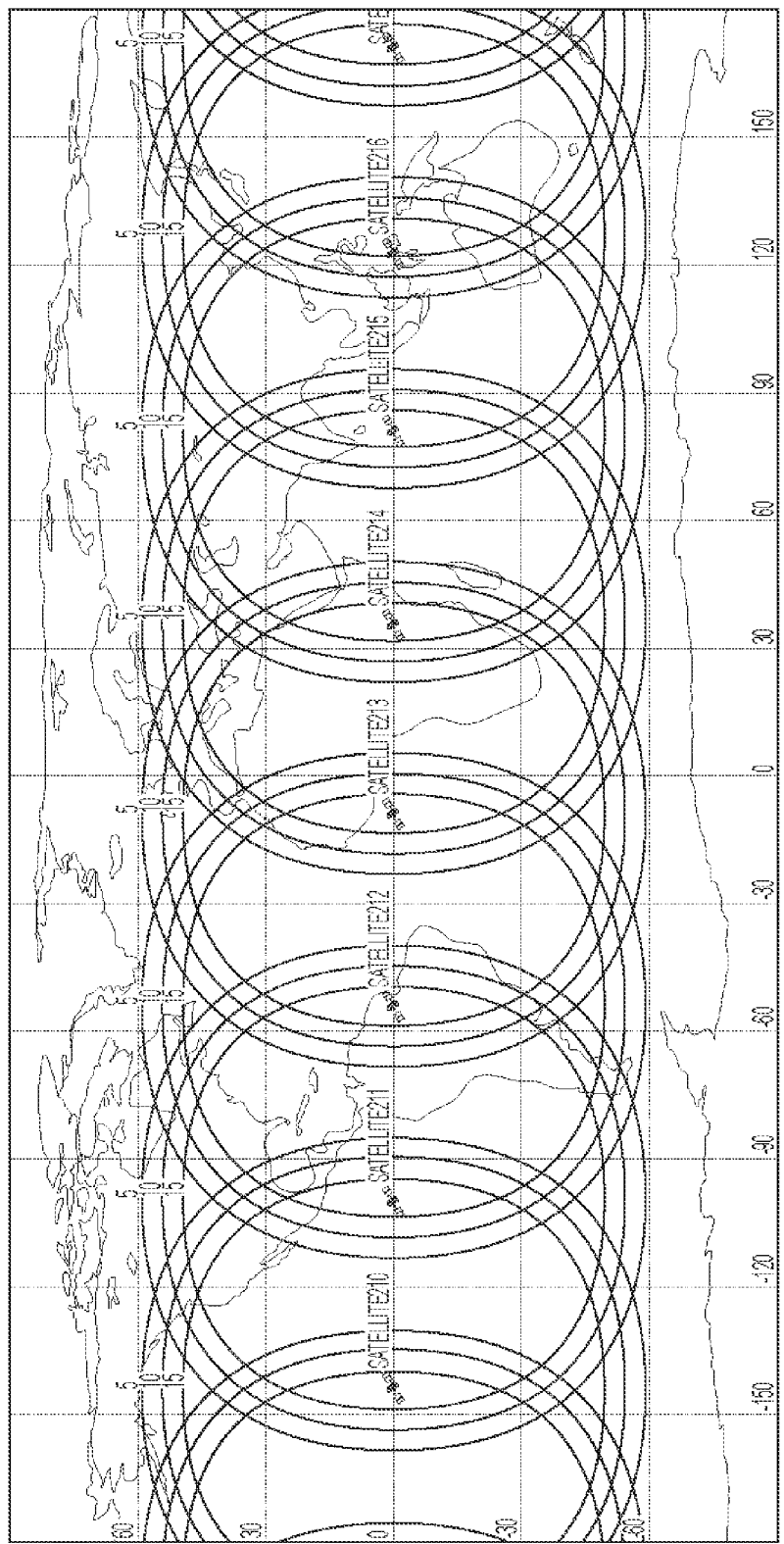
FIG. 6A depicts Other-Three-Billion (O3b)-like constellation of satellites, according to a one embodiment.

FIG. 6A depicts an Other-three-billion (O3b)-like constellation of satellites, according to a one embodiment. In the O3b-like constellation, for example, 8 satellites in one orbit plane at an altitude of about 8000 km at 0 deg. orbital inclination are provided. In the O3b-like constellation, coverage over vast regions is obtained with only one orbit plane as the orbit plane of the 8 satellites is positioned at the equator and the satellites orbit at relatively high altitude 8000 km. For example, coverage of South America, Africa, India, China, etc. is achieved, as well as the United States and most of Europe. In this case, the number of transceivers can be reduced because not more than two forward transceivers and two aft transceivers may be needed. This will enable connections from one satellite to the two closest satellites in front of the satellite and the two closest satellites behind the satellite. As a result, multiple redundancy can be achieved in case of failure.

Figure 6B:
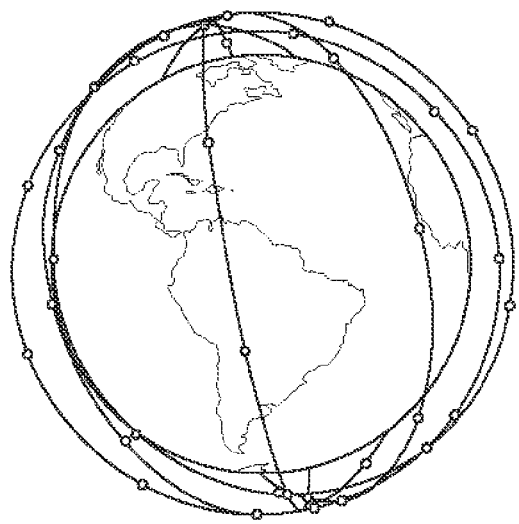
FIG. 6B depicts a sun-synch constellation of satellites, according to another embodiment.

FIG. 6B depicts a sun-synch constellation of satellites, according to another embodiment. In this constellation, for example, 45 satellites in 5 orbit planes at an altitude of about 1250 km at 100.6 deg. orbital inclination are employed. In this case, each orbit plane has 9 satellites. In this case, the total number of satellites is greater than in the O3b-like constellation. However, this number of satellites may be needed in some applications such as climate monitoring applications and remote sensing applications where a satellite goes over a given part of the globe at the same time every day.

Figure 6C:
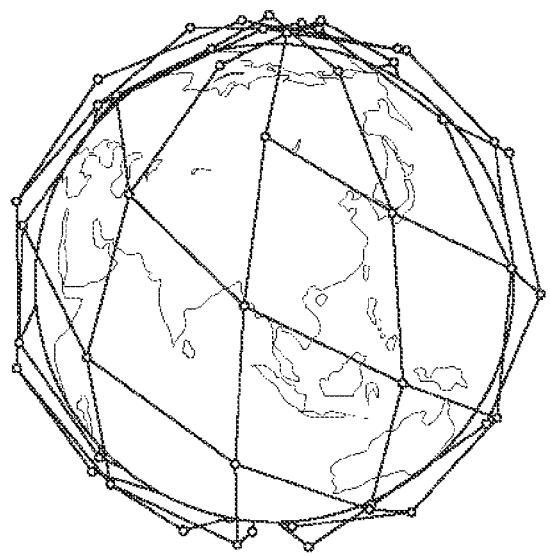
FIG. 6C depicts an Iridium®-like constellation of satellites, according to yet another embodiment.

FIG. 6C depicts an Iridium®-like constellation of satellites, according to yet another embodiment. In this constellation, for example, 66 satellites in 6 orbit planes at an altitude of 780 km at 86.4 deg. orbital inclination can be employed. Therefore, in the Iridium®-like constellation, each orbit plane has 11 satellites.

The types of constellations that can be implemented is not limited to the above exemplary constellations but can be extended to other types of constellations. For example, a network mesh or some other kind of network architecture that changes over time can also be implemented.

As it can be appreciated from the above paragraphs, satellite system 10 is easily extendable by adding satellites to an already existing constellation of satellites. This can be done to replenish old nodes or create new nodes with either historic or enhanced capabilities. For example, new satellites can be inserted into an existing orbit plane and easily connect to neighboring satellites using steering capability of the laser communication transceivers.

Furthermore, the use of lightweight, low-power laser communication transceivers provides a high-speed network in space with redundant paths. The use of laser communication transceivers provides relatively large angle (e.g., ±30 degree or more) steering with low weight, power, and disturbance impacts. The use of laser crosslink transceivers enables pointing the laser line-of-sight and perform look-ahead, dispersion and jitter compensation, as well as track neighboring satellites to maintain a continuous connection during desired intervals.

Although the inventive concept has been described in detail for the purpose of illustration based on various embodiments, it is to be understood that such detail is solely for that purpose and that the inventive concept is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Furthermore, since numerous modifications and changes will readily occur to those with skill in the art, it is not desired to limit the inventive concept to the exact construction and operation described herein. Accordingly, all suitable modifications and equivalents should be considered as falling within the spirit and scope of the present disclosure.

What is claimed:

1. A satellite communication system, comprising:
   a first transceiver and a second transceiver geographically fixed on the earth;
   a first satellite configured to communicate with the first transceiver through a first link; and
   a second satellite configured to communicate with the second transceiver through a second link and communicate with the first satellite through a laser communication crosslink, wherein the laser communication crosslink employs wavelength division multiplexing so as to increase data rate, wherein in the wavelength division multiplexing, a plurality of wavelengths are employed in the laser communication crosslink for transmitting data and plurality of wavelengths are employed in the laser communication crosslink for receiving data.

2. The system of claim 1, wherein the first transceiver is provided on an airborne asset.

3. The system of claim 2, wherein the first transceiver on the airborne asset comprises an antenna configured to track the first satellite.

4. The system of claim 2, wherein the airborne asset is an unmanned aerial vehicle.

5. The system of claim 1, wherein the second transceiver is a ground base station.

6. The system of claim 5, wherein the ground base station is within a transmission coverage of the second satellite so as to receive a transmission from the second satellite.

7. The system of claim 5, wherein the ground base station comprises a plurality of antennas configured and arranged so that a field of regard of the antennas provides a period of time sufficient for the second satellite to downlink data to the ground base station during orbit transit of the second satellite.

8. The system of claim 1, wherein the first transceiver is configured to uplink data to the first satellite, the first satellite is configured to relay the data to second satellite via the laser communication link, and the second satellite is configured to downlink the data to the second transceiver.

9. The system of claim 1, wherein the first transceiver is configured to communicate with the first satellite and the second satellite is configured to communicate with the second transceiver with low time latency less than approximately 100 ms.

10. The system of claim 1, wherein the first transceiver is configured to communicate with the first satellite and the second satellite is configured to communicate with the second satellite at a data rate greater than about 1 gigabits per second.

11. The system of claim 1, wherein a data rate of the laser communication crosslink is greater than approximately 1 gigabit per second.

12. The system of claim 1, wherein the laser communication crosslink operates at two laser wavelengths, one wavelength for sending data and another wavelength for receiving data.

13. The system of claim 1, wherein the laser communication crosslink operates using two polarization modes, one polarization mode for sending data and another polarization mode for receiving data.

14. The system of claim 1, wherein the first link and the second link are radio frequency communication links or laser communication links, or a combination thereof.

15. The system of claim 1, further comprises a ground control station configured to communicate with the first satellite or the second satellite so as to select a desired route for transmitting data received by the first satellite to the second satellite.

16. The system of claim 1, wherein the first satellite and the second satellite are configured to autonomously compute a desired route for transmitting data between the first satellite and the second satellite without being controlled to do so by a ground control station.

17. The system of claim 1, wherein the first satellite and the second satellite comprise a plurality of radio frequency receivers, one radio frequency transmitter and a plurality of laser communication transceivers.

18. The system of claim 17, wherein the first transceiver includes a plurality of transceivers on a plurality of airborne assets,
the plurality of radio frequency receivers of the first satellite are configured to receive data from the plurality of transceivers on the plurality of airborne assets,
one of the laser communication transceivers of the first satellite is configured to transmit the data to one of the laser communication transceivers of the second satellite, and
the one radio frequency transmitter of the second satellite is configured to transmit the data to the second transceiver.

19. The system of claim 17, wherein the plurality of radio frequency receivers include four radio frequency receivers.

20. The system of claim 17, wherein the plurality of laser communication transceivers include six laser communication transceivers.

21. The system of claim 1, wherein the first satellite and the second satellite are part of a constellation of low earth orbit satellites.

22. The system of claim 1, wherein the first satellite and the second satellite are part of a constellation of a plurality of low earth orbit satellites.

23. The system of claim 1, wherein the first satellite and the second satellite are part of a constellation of low earth orbit satellites.

24. The system of claim 1, wherein the system is extendible by adding a third satellite such that the third satellite is configured to communicate with the first satellite or the second satellite though another laser communication crosslink.

25. The system of claim 1, wherein the system is reconfigurable by upgrading software or hardware of the first satellite or the second satellite, or both.

* * * * *